United States Patent
Bringolf

[15] 3,706,326
[45] Dec. 19, 1972

[54] FLEXIBLE CONDUIT

[72] Inventor: Richard G. Bringolf, 550 S. Monroe Street, Seattle, Wash. 98108

[22] Filed: July 9, 1971

[21] Appl. No.: 161,080

[52] U.S. Cl. .................. 138/129, 138/150, 138/154
[51] Int. Cl. .............................................. F16l 11/10
[58] Field of Search....... 138/129, 150, 154, 122, 133

[56] References Cited

UNITED STATES PATENTS

| | | | |
|---|---|---|---|
| 1,876,665 | 9/1932 | Greig | 138/150 X |
| 2,810,400 | 10/1957 | Hewitt | 138/122 |
| 2,486,387 | 11/1949 | Bringolf | 138/122 |
| 2,884,957 | 5/1959 | Harris et al. | 138/122 |
| 2,890,723 | 6/1959 | Evert | 138/122 |
| 3,216,458 | 11/1965 | Sabe | 138/122 |
| 3,252,483 | 5/1966 | Swan | 138/122 |

*Primary Examiner*—Meyer Perlin
*Assistant Examiner*—Ronald C. Capossela
*Attorney*—Ford E. Smith

[57] ABSTRACT

Enhanced flexibility of a wear-resistantly lined conduit, reinforced by a spiroid incorporated in the structure, is accomplished by employing internally a continuous spirally-configured, partially unattached, supple liner serving to shield the internal peak portions of the conduit related to the spiroid from wear caused by the passage through the conduit of abrasive-particle-laden air and other gaseous streams. Suppleness of the liner is further enhanced by dividing a trailing portion of the liner into separate leaf-like portions.

9 Claims, 6 Drawing Figures

PATENTED DEC 19 1972

3,706,326

INVENTOR
RICHARD G. BRINGOLF
BY
Ford E. Smith
ATTORNEY

FLEXIBLE CONDUIT

SUMMARY OF THE INVENTION

This invention is concerned with relatively large diameter flexible conduit or hose useful in conducting air and other gaseous streams, or in space ventilating applications, or in the handling of bulk particulate materials such, for example, as grain or the like. High flexibility and suppleness of the conduit to facilitate manipulation for directional changes is highly desirable. Low weight permitting manual manipulation is a further important factor. And where such conduit is used, as in grain handling or in conducting particle-laden air, it is very desirable that the conduit be internally abrasive resistant to provide a long and useful life. Ordinarily such conduits comprise a spiroid as the main structural element covered with light weight fabric or plastic materials to provide an air impervious passage. The convolutions of the spiroid are spaced apart. The covering materials span the spaces and cover the spiroid both externally and internally. As fluid streams pass through the conduit the inner peaks produced by the relatively inflexible convolutions of the spiroid are subjected to considerable and continuous abrasive action. Abrasive action is particularly noticeable at the bends of such conduit, apparently due to the gaseous stream and particles borne by it tending to follow the shortest path through the conduit. As a result internal wear occurs rapidly and materially shortens the life of the conduit.

In my earlier U. S. Pat. No. 2,486,387 is shown a hose or flexible conduit which served normal gas stream handling requirements but with which internal wear was encountered when the gas stream included particles, particularly those of an abrasive nature. It would naturally occur to one that a liner for the conduit would combat the wear problem. However, such liners as were known failed to satisfactorily overcome the difficulty because they unduly stiffened the conduit or made it so heavy that it was practically impossible to manually move or manipulate it. A form of metallic spiral liner is noted in the Evert U.S. Pat. No. 2,890,723 where there are trailing edges overlapping one after the other and intended to shield underlying structure from wear irrespective of whether the conduit is straight or bent. Applying the Evert concept to conduits of the type in my earlier patent, even though non-metallic materials were used, produced an internally protected structure. However, it was heavy and so relatively inflexible as to be generally undesirable for its intended uses. After considerable study of the problem it was discovered that the spiral liner must be not only formed of non-metallic material but its trailing portion must be divided into a series of separate leaf-like elements.

It will therefore be seen that the main object of this invention has been the provision of a highly flexible, highly wear-resistant conduit, lightweight and easily manipulated in use to change directions. Other objects will be apparent during the course of the following description.

DRAWING VIEWS DESCRIBED

DETAILED DESCRIPTION

Figure 1:
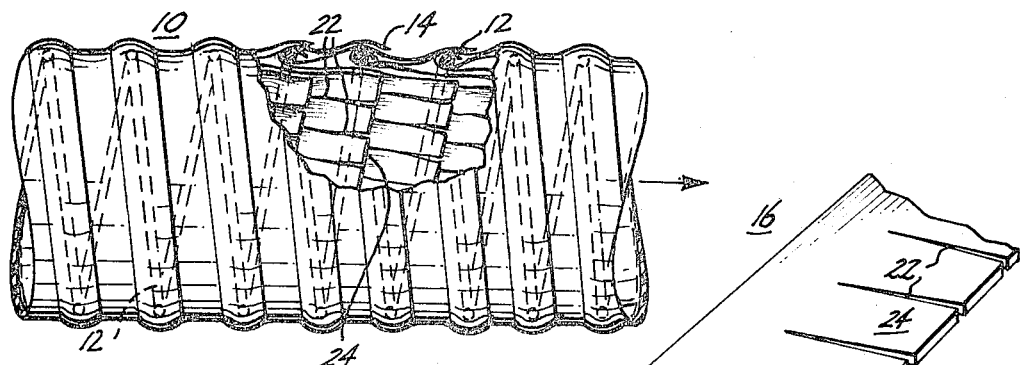
FIG. 1 is a view of a section of flexible conduit according to this invention, a portion being broken-away to illustrate the interior.

In FIG. 1 is shown a section or length 10 of a form of tubular flexible conduit incorporating the present invention. A continuous reinforcing spiroid 12 constitutes the base or frame of the conduit. The preferred form of spiroid 12 is a strong wire helically formed into a series or succession of convolutions. The spiroid 12 is wrapped in an impervious flexible covering, preferably a textile strip 14, extending the full length of the conduit and applied in a helical manner.

Production of such a conduit may be accomplished by means of apparatus somewhat as shown in the Bringolf U.S. Pat. No. 2,486,387. Essentially a juxtaposed pair of cantilevered, counter-rotated, driven rolls receive an endless wire 16 and one or more endless textile strips. The rolls form the wire into a spiroid and the tape thereabout into a tube through the instrumentality of a spiral groove on one of the rolls. Normally the tube forms about the other roll.

Figure 3:
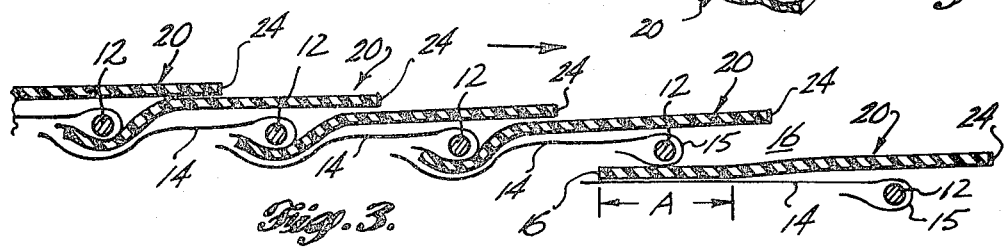
FIG. 3 is an enlarged longitudinal sectional view of a wall portion of a flexible conduit according to a preferred form of the invention.

Strip 14 is folded at 15 about wire 12 as shown to the right in FIG. 3. Liner strip or ribbon 16 is superposed to strip 14 as it moves into the forming rolls. Preferably the leading portion 18 of strip 16 is adhesively attached in the area A to strip 14 indicated in FIG. 3. Trailing portion 20 of strip 16 is unattached to the strip 14 for reasons more apparent later in this disclosure.

During conduit forming the assembled strips 14, 16 and wire 12, the latter enclosed in fold 15, move into the rolls. The leading edge of strip 14 and the leading portion 18 of liner strip 16 span the enfolded wire of the preceding convolution (see FIG. 3). As the assembly passes between the rolls the leading portions of the strips are tightly pressed to and formed about the enfolded wire as best seen to the left in FIG. 3 and in greater detail in FIG. 4. The assembly in the lines of contact is adhesively joined or bonded together.

The unsecured trailing portion 20 of liner strip 16 internally overlies the inner surface of the strip-enfolded wire spiroid 12. Liner 16 thus shields and protects the same from the abrasive action of particle laden air or gaseous streams passed through the conduit in the directions of the arrows shown in the various figures of the drawings.

Figure 2:
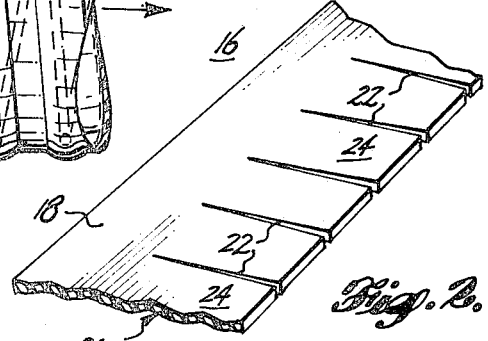
FIG. 2 is a perspective view of a portion of a strip or ribbon liner.

In FIG. 2 the liner strip 16 is shown as having a plurality of slits 22 extending inward from the edge of trailing portion 20. By this means the trailing portion of the liner is divided in a series of separate leaf-like elements 26 which permit the conduit to be easily flexed during use despite the stiffening effect usually resulting from the inclusion of an extra strip in the conduit. As the conduit 10 structure is flexed or arcuately bent, one inner surface of the conduit tends to elongate and the opposite inner surface of the arc is shortened. By reason of the non-attachment of the trailing portion of liner 10 the convolutions tend to adjust relative the conduit and less and more overlap but nevertheless continue to shield the enfolded spiroid ridges against abrasion.

It has been found preferable to use a pure rubber strip to form the liner. It has great flexibility, resistance to wear, and high conformance as to shape as it is incorporated in the conduit structure. Such a rubber strip as 16, edge slit at 22 as shown, may be wound into the structure, under conditions whereby tension is applied to the leading portion. Under such circumstances the slits tend to open as small vees. Thus, when a convolution of strip 10 is produced and tension relaxes slightly the vees close together somewhat but the edges of the separate elements 24 do not usually overlap. When the liner is slit as described but formed of a non-resilient material such as textile strip, the separate leaf-like elements pile up slightly. This, however, is not particularly objectionable even though a slight reduction in the size of the passage may result. In FIG. 2, slits 22 are shown as perpendicular to the trailing edge. On occasion it may be desirable to provide slits 22 in angular disposition to the trailing edge of strip 16. Also, the leaf elements 24 may be wholly separate elements and need not necessarily be formed as a strip.

In the larger dimension flexible conduits it has been found that the leaf-like elements may be proportionally longer than shown in FIG. 2. For example in 8 inch diameter conduit for certain uses the elements 24 may be 6 inches long, there being about four such elements 24 per convolution of liner.

Figure 4:
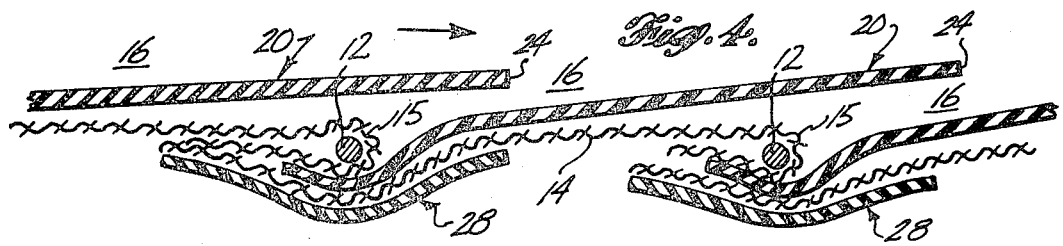
FIG. 4 is a further enlarged view detailing the conduit construction of FIG. 3.

In order to externally reinforce a conduit which may be dragged over rough and wearing surfaces, the external ridges forming the spiroid and its casings are protected by a shielding tape 28 shown in FIG. 4. This tape is applied as the conduit is being formed and is secured in place adhesively.

Figure 5:
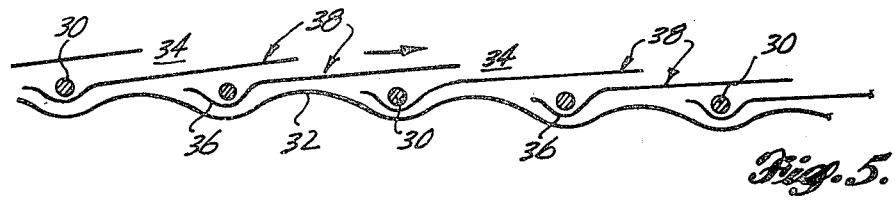
FIG. 5 shows an alternative conduit construction embodying the invention.
Figure 6:
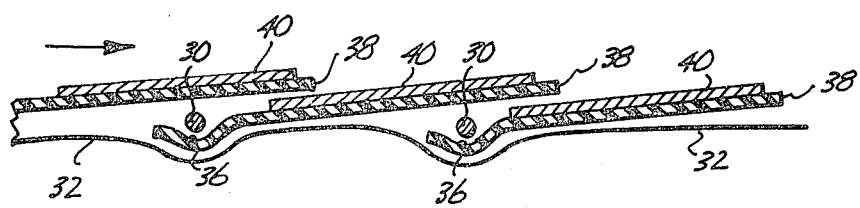
FIG. 6 illustrates a lined conduit in which the liner is wear-resistant plated.

In FIG. 5 the conduit is shown as comprising the spiroid 30 wrapped or encased in a tubular, flexible covering 32. The liner strip 34 has its leading portion 36 disposed external of the reinforcing spiroid and within covering 32. As described above, the trailing portions 38 of liner 34 overly the inner surface of the covering and shield it from abrasion. Another variation is shown in FIG. 6 in that the trailing leaf-like elements of the liner are armored by plates 40 laminated thereto. Plates 40 may be either metallic or plastic, or be formed of abrasive-resistant coating material.

The preferable and alternate forms of flexible conduit shown and described in detail are fully capable of satisfying the objects of this invention and of providing the advantages stated above. This showing, however, is to be understood to be merely illustrative of the presently preferred embodiments. Modifications and alterations will naturally occur to those skilled in the pertinent art. All such as by a reasonable and fair application of the doctrine of equivalents fall within the scope of the subjoined claims are intended to be covered by this patent.

What is claimed is:

1. In a flexible conduit of the type comprising a continuous reinforcing spiroid wrapped in a flexible covering which is secured thereto to form a tubular structure, the improvement, comprising:
   a spirally convoluted, non-metallic liner within said structure extending from end-to-end thereof;
   each convolution of said liner having a leading portion anchored within said tubular structure and a supple trailing portion extending in overlapped and unsecured relation to the leading portion of a preceding convolution of said liner; the trailing edge portion of said convoluted liner being divided into a series of separate leaf-like elements.

2. The improvement according to claim 1 in which the liner is a compressible ribbon having edge slits in its trailing portion.

3. The improvement according to claim 2 in which the slits between the leaf-like elements of the liner diverge rearwardly.

4. The improvement according to claim 2 in which the trailing portion of the liner is serially slit substantially normal to its edge to form a continuous series of separate leaf-like elements.

5. The improvement according to claim 4 in which the leading portion of the liner is disposed outward of the convolutions of the spiroid and is pressed and held thereto by the flexible covering.

6. The improvement according to claim 1 in which the flexible covering is a spirally convoluted tape and the leading portion of the liner is disposed between the convolutions of the spiroid and the inside of said flexible covering.

7. The improvement according to claim 6 in which the leading portion of the liner is adhesively attached to the inside of said flexible covering.

8. The improvement according to claim 1 in which the inner surfaces of the leaf-like elements are armored.

9. The improvement according to claim 8 in which the leaf-like elements are armored with plates of wear-resistant material.

* * * * *